(12) United States Patent
Pichler et al.

(10) Patent No.: US 8,727,665 B2
(45) Date of Patent: May 20, 2014

(54) METHOD AND DEVICE FOR INTRODUCING A PIPE FOR OPTICAL CABLES INTO A SOLID LAYING FOUNDATION

(75) Inventors: Jan Michael Pichler, Ybbsitz (AT); Alois Pichler, Ybbsitz (AT)

(73) Assignee: Jan Michael Pichler, Ybbsitz (AT)

( * ) Notice: Subject to any disclaimer, the term of this patent is extended or adjusted under 35 U.S.C. 154(b) by 0 days.

(21) Appl. No.: 13/521,626

(22) PCT Filed: Jan. 17, 2011

(86) PCT No.: PCT/AT2011/000025
§ 371 (c)(1),
(2), (4) Date: Jul. 11, 2012

(87) PCT Pub. No.: WO2011/088486
PCT Pub. Date: Jul. 28, 2011

(65) Prior Publication Data
US 2013/0011198 A1    Jan. 10, 2013

(30) Foreign Application Priority Data
Jan. 21, 2010   (AT) .................................. A 77/2010

(51) Int. Cl.
*F16L 1/028*   (2006.01)
(52) U.S. Cl.
USPC ........ 405/157; 405/154.1; 405/174; 299/39.3
(58) Field of Classification Search
USPC ............. 405/157, 174, 154.1, 176, 178, 179; 37/142.5, 465, 189; 299/39.3, 39.2
See application file for complete search history.

(56) References Cited

U.S. PATENT DOCUMENTS

| | | | | |
|---|---|---|---|---|
| 3,559,599 A | * | 2/1971 | Hoadley | 111/200 |
| 6,158,925 A | * | 12/2000 | Schleining et al. | 405/179 |
| 6,371,691 B1 | | 4/2002 | Finzel et al. | |
| 7,624,817 B2 | * | 12/2009 | Putnam | 175/53 |
| 2002/0061231 A1 | * | 5/2002 | Finzel et al. | 405/154.1 |
| 2004/0165957 A1 | | 8/2004 | Serrano et al. | |

FOREIGN PATENT DOCUMENTS

| | | |
|---|---|---|
| CN | 100342605 C | 10/2007 |
| DE | 3805344 A1 | 8/1989 |
| EP | 0162623 A1 | 11/1985 |
| EP | 0861455 A2 | 9/1998 |
| FR | 2766634 A1 | 1/1999 |
| WO | 97/20236 A2 | 6/1997 |

OTHER PUBLICATIONS

Office Action issued on Sep. 15, 2010 in Austrian Patent Application No. A77/2010 filed on Jan. 21, 2010.

(Continued)

*Primary Examiner* — Sean Andrish
(74) *Attorney, Agent, or Firm* — Stroock & Stroock & Lavan LLP

(57) ABSTRACT

A method and an apparatus for introducing at least one pipe for at least one optical cable into a solid bed with the aid of a laying device. At least one groove is milled or cut in the bed and the at least one pipe is inserted in the groove. At least one side wall of the groove is configured with a step for supporting a filler material. After laying the pipe the remaining volume of the groove is filled. Alternatively, the pipe can be formed according to the groove. In addition, the friction between the at least one pipe laid in the groove and the side walls of the groove can be increased so that emergence of the at least one pipe of its own accord from the at least one groove is prevented.

40 Claims, 7 Drawing Sheets

(56) References Cited

OTHER PUBLICATIONS

International Preliminary Report on Patentability issued on Mar. 2, 2012 in International Application No. PCT/AT2011/000025 filed on Jan. 17, 2011.

"Autologger: A unique range of axle detection sensors" Highways, DR Publications Ltd., Crydon, GB, vol. 57, No. 1951, Jul. 1, 1989, pp. 9/10 and 13, XP000052670.

Office Action issued in the corresponding Chinese Patent Appln. No. 201180006519.5 issued on Nov. 15, 2013.

* cited by examiner

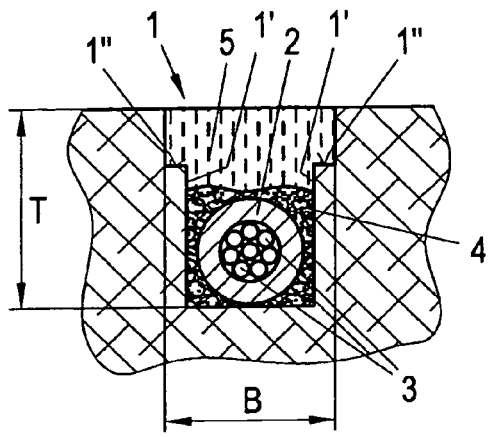
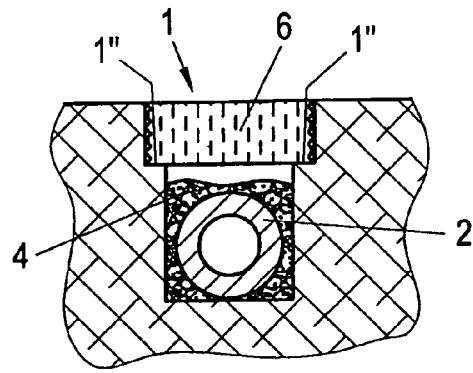
Fig. 1  Fig. 2
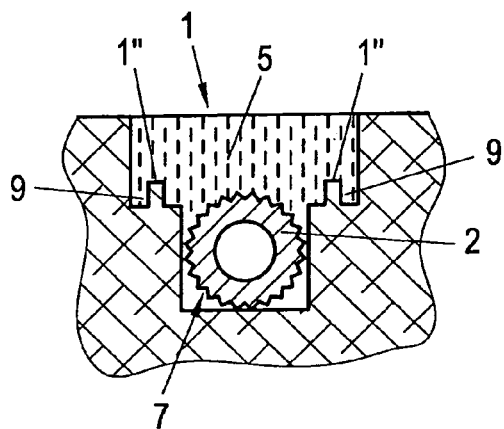
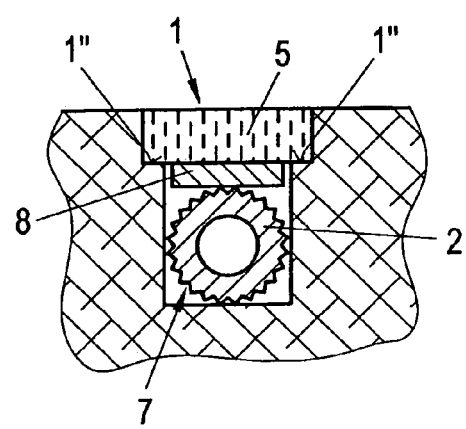
Fig. 3  Fig. 4
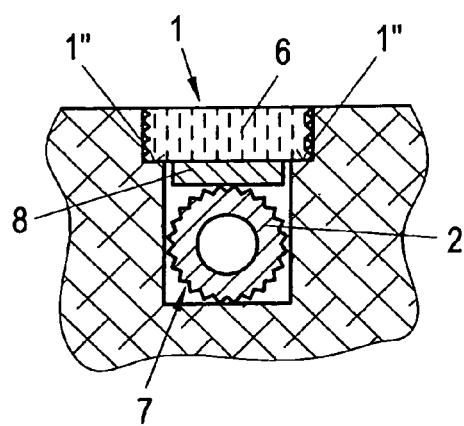
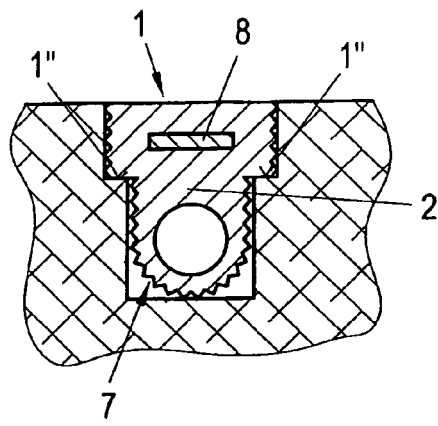
Fig. 5  Fig. 6

US 8,727,665 B2

METHOD AND DEVICE FOR INTRODUCING A PIPE FOR OPTICAL CABLES INTO A SOLID LAYING FOUNDATION

CROSS-REFERENCE TO RELATED APPLICATIONS

This application is a national stage application under 35 U.S.C. 371 based on and claiming the benefit of International Application Serial No. PCT/AT2011/000025 filed on Jan. 17, 2011, which claims the benefit of priority from Austrian Patent Application No. A77/2010 filed on Jan. 21, 2010, the entire contents of each of which are incorporated herein by reference.

BACKGROUND

The invention relates to a method for introducing at least one pipe for at least one optical cable into a solid bed with the aid of a laying device, wherein at least one groove is milled or cut in the bed and the at least one pipe is inserted in the at least one groove.

The present invention further relates to an apparatus for introducing at least one pipe for at least one optical cable into a solid bed, comprising a milling or cutting device for milling or cutting at least one groove in the bed and at least one drum on which the at least one pipe to be laid is wound.

Nowadays, many households throughout the world are still connected via copper cables with corresponding data networks for the transmission of telephone, television, or computer signals. Whereas the various communication networks of different information services have already gradually been converted from copper to glass fibre cable and data transmission rates have thereby been able to be substantially increased, the conversion of copper cables to glass fibre cables at the end consumer is still lagging behind. As a result of innovative methods such as, for example, the trenchless removal of wires from cable tubes described in EP 1 362 398 A, the retrofitting of lines to the end consumers is now possible with reasonable expenditure. If the copper tube of a buried cable freed from the copper wires is used to receive optical cable, the household would be separated from the respective communication networks for a certain time interval between the removal of the copper cable and the relaying of the optical cable. Since such a state would be unacceptable at the present time, it is necessary to provide for an alternative data connection at least during this time interval.

Wireless systems are used for bridging the data connection, via which the end consumer is connected to the desired communication networks. However, the expenditure for the corresponding transmitter and receiver is relatively high. The corresponding components must also be supplied with electrical energy via batteries and suitably protected against theft.

Alternatively to this, a bypass data line can be installed, via which the end consumer is connected to the corresponding communication networks during the time of the retrofitting of the data line. Freely running data lines which per se could be laid rapidly and easily have not proved successful on account of their susceptibility to weather and destruction. The expenditure for the laying of buried cables, on the other hand is again very high and frequently not economically sustainable.

For this reason, methods and apparatuses for the rapid and cost-effective introduction of optical cables into a solid bed have already been developed. For example, EP 0 861 455 B1 describes a method for introducing at least one optical cable into a solid bed by which means the laying expenditure can be reduced.

EP 1 619 767 A1 describes such a method for laying optical cables in a solid bed.

EP 0 162 623 A 1 relates to a method for laying drainage pipes in the ground, where no measures are taken to protect the pipe from damage.

US 2004/165957 A1 relates to a method for laying a tube for optical cables in a solid bed, wherein the tube is protected with a jacket of compressible material.

Finally, DE 38 05 344 A1 discloses a universally applicable apparatus for constructing general trenches.

In the known laying methods, a groove is usually milled and cut in the solid bed, then the at least one optical cable or a pipe for receiving at least one optical cable is inserted in the groove and a corresponding filler material, such as for example, bitumen is poured into the groove over the cable or a pipe receiving the optical cable and hardened. Although these laying methods can be carried out more rapidly and inexpensively compared with conventional methods for laying buried cables, the expenditure is nevertheless relatively high. Also, as a result of the inadequate retention of the optical cable or pipe in the groove, an undesirable emergence of the optical cable or pipe from the groove occurs in some places, before the filler material is hardened. In consequence, some damage or destruction of the optical cable and therefore an interruption of the data line can occur.

When using hot bitumen for filling the groove, damage to the optical cable or the pipe surrounding the optical cable can additionally occur.

A further disadvantage in the known methods is that frequently a groove that is too deep is cut in the bed and for example, a road surface is thereby cut through in places so that the pipe for the optical cable runs unprotected in loose earth located thereunder and can be damaged. In addition, when cutting through an asphalt surface, partial breakup of the asphalt surface may occur, which in turn must be renovated in time-consuming and expensive working steps.

SUMMARY OF THE INVENTION

It is therefore the object of the present invention to provide an aforesaid method and an aforesaid apparatus, in particular for the temporary introduction of at least one pipe for at least one optical cable in a solid bed, by which means a rapid and simple laying is possible avoiding or reducing the aforesaid disadvantages. In particular, the pipes inserted in the groove or the optical cables laid therein should be protected from damage.

In the procedural aspect, this object is solved by configuring at least one side wall of the at least one groove with a step for supporting a filler material, by which after laying the at least one pipe the possibly remaining volume of each groove is filled, or a pipe formed according to the groove. As a result of the step-shaped formation of at least one side wall of the groove, a support is formed for a pipe formed according to the groove or the possible filler material, whereby a force acting on the surface of the bed can be led off via this supporting step into the bed without inadmissibly high forces acting on the pipe, which could result in damage to the optical cable laid therein. The step need not necessarily be disposed at right angles to the side wall of the groove but can also run at an angle thereto. In principle, merely one supporting step can be disposed in one side wall of the groove so that a groove having a cross-section in the form of an inverted "L" results. The method according to the invention is used in particular for merely transient or temporary introduction of optical cables into a solid bed in order, for example, to ensure an uninterrupted connection of the consumer to the respective data or communication networks during the conversion workings of a buried cable from copper cable to optical cable. Likewise, with the present method, an independent glass fibre network can be constructed for different development stages (FTTH fiber to the home, FTTB fiber to the building, FTTC fiber to the curb) parallel to an existing copper cable network. The method can be implemented particularly rapidly and therefore cost-effectively and offers optimal protection for the optical cables to be laid, so that the connection to the consumer is not endangered. The method can be used with any possible solid bed, in particular an asphalt or concrete surface of a roadway or a footpath. The respective house connection of a consumer is thereby connected as far as possible over the shortest path to the nearest possible connection point of the data or communication network. If crossing points should occur in the course, these can be overcome, for example, by deeper grooves in places or by providing corresponding connection devices. Although in the following description frequently only the simplest case of producing only one groove and laying only one pipe for optical cable is assumed, the method naturally covers the production of a plurality of preferably parallel grooves and also the case that a plurality of pipes are laid in each groove. In the case of disposing a plurality of pipes per groove, these can also be surrounded by a common cladding or also a one-piece pipe having a plurality of channels for receiving respectively a plurality of optical cables can be provided. Both the pipe and also the said cladding can be present in the form of a hollow cylinder but can also have any other cross-section with one or a plurality of channels for receiving the optical cables. If the respective groove is not completely filled by the at least one pipe, it is provided that the remaining volume in each groove is filled with a corresponding filler material.

According to a further feature of the invention, both side walls of the at least one groove can be formed with a supporting step, resulting in a substantially T-shaped cross-section of the groove. If the possibly remaining volume of the groove after laying the at least one pipe is filled with a hardenable filler material, this hardened filler material rests on the two symmetrically disposed supporting steps and forces which occur can be correspondingly led off. The hardenable filler material can also be elastically deformable in the hardened state, whereby the formation of gaps between the inner wall of the groove and the filler material can be avoided.

In addition, in the at least one supporting step an additional groove can be milled or cut in at least one side wall of each groove, whereby a web is formed between the groove for receiving the pipe and the at least one additional groove. By means of this web, preferably both webs in a groove having supporting steps disposed on both sides and additional grooves, the groove is fixed in the horizontal direction by the filler material which may be provided or also by a correspondingly shaped pipe. If the solid bed should be cut through in places by the groove for receiving the pipe, it can be held together by these webs or shoulders. This in turn results in a better protection for the at least one pipe laid in the groove and the optical cable laid therein.

Advantageously, the at least one groove having a width.l-toreq.60 mm is milled or cut in the bed. The depth is, for example, 150 mm depending on the condition and type of the bed. The depth is selected so that cutting through the bed can be prevented as far as possible. On the other hand, in particular when used in asphalt roads, the depth is selected to be greater in order to enable a subsequent milling of the road without damaging the optical cable. For example, a so-called overlap (that is the distance between the road surface and the uppermost surface of the cable or cladding) of 80 mm is desired or demanded by road operators. As a result of the specified relatively small dimensions of the groove, the milling or cutting process can be carried out relatively rapidly and the risk of completely cutting through the solid bed in places can be substantially reduced.

Advantageously, the friction between the at least one pipe laid in the at least one groove and the side walls of the at least one groove is increased so that emergence of the at least one pipe of its own accord from the at least one groove is prevented. This further measure according to the invention of increasing the friction between the at least one pipe inserted in the at least one groove and the side walls of the at least one groove, prevents or makes it difficult for the pipe to emerge from the groove and be damaged before the possible filling of the groove with a filler material. There are various possibilities for increasing the friction between the pipe and the side walls of the groove, which are specified hereinafter.

According to a further feature of the invention, it is provided that after laying the at least one pipe in the at least one groove, a granular material or the like having a grain size of 0.4 to 1.5 mm, preferably rubber granular material, is introduced into the at least one groove, whereby a wedging of the at least one pipe inside the at least one groove is brought about. By means of this measure, emergence of the at least one pipe of its own accord from the at least one groove can be simply and effectively prevented. In this case, the granular material is preferably scattered on the pipe immediately after introducing the pipe into the groove, with the result that the granular material flows into the gap between side wall of the groove and outer surface of the pipe and the pipe is as it were fixed in the groove. In principle, most diverse granular materials preferably having an irregular and angular shape having a corresponding grain size of 0.4 to 1.5 mm can be used as granular material. It is particularly suitable to use rubber granular material which results in a better wedging of the pipe inside the groove as a result of the intrinsic elasticity. However, sand can also be used as granular material. The granular material can also be coloured, whereby during cutting and milling work on the bed, the optical cables laid in the groove can be indicated.

An alternative or additional method for increasing the friction between the pipe and the groove can be implemented by providing the outer side of the pipe at least in parts with a friction-enhancing coating or friction-enhancing elements or by roughening the outer side of the pipe. A friction-enhancing coating can, for example, be accomplished by applying a granular material or the like in some places to the outer side of the pipe. For example, the pipe can be provided with an adhesive in some places on its outer side and be strewn with sand or suitably configured friction-enhancing elements before the adhesive hardens so that the pipe can no longer emerge from the groove after laying in the groove.

It is likewise possible that before laying the pipe in the groove, the pipe is provided with a cladding which has a friction-enhancing coating or friction-enhancing elements on the outer side or is suitably roughened. The cladding with the friction-enhancing coating, the friction-enhancing elements or the roughened outer side can be suitably prefabricated and arranged over the at least one pipe just before laying.

After laying the at least one pipe in the at least one groove, a cover strip can be laid in the at least one groove. The cover strip which can be differently configured, forms a partition wall between the pipe and the possible filler material and protects the pipe and the optical cables running therein accordingly. The cover strip can, for example, consist of foam and nestle accordingly against the outer side of the pipe. Cover strips of harder material, in particular steel, which can also have various profiles, are also feasible for protecting the at least one pipe or the optical cables running therein. A cover profile of steel running in a roof-shaped profile can also effectively prevent any damage to the pipe by pointed objects such as, for example, nails, since these pointed objects are deflected into the groove when they are possibly driven in and the pipe and the optical cables can thus be protected from any damage by the pointed object. The cover strip can also be configured to be multipart, for example, comprising a foam layer on the underside, facing the pipe, and a metal layer on the upper side facing the possible filler material. The cover strip can be introduced into the groove simultaneously with the at least one pipe or in a time-delayed working step after introducing the pipe.

The possibly remaining volume of each groove can be filled with a hardenable filler material, preferably a biologically degradable and water-soluble two-component adhesive. After the hardening time, the at least one pipe in the groove is therefore additionally and on a long-term basis protected from any emergence from the groove. In contrast to the bitumen usually used to fill the groove, two-component adhesives which harden at lower temperatures are particularly suitable. As a result, the pipe which can already be provided with the optical cables is also not thermally loaded. If necessary, a certain acceleration of the hardening can be accomplished by slightly increasing the temperature, for example, by a warm air stream.

Alternatively to the use of a hardenable filler material, the possibly remaining volume of each groove can also be filled with an elastic and/or solid filler material. In this case, the remaining volume of each groove is closed by a strip of the elastic and/or solid filler material of suitable size. In this method, the filler material can be accordingly pressed into the groove and automatically held in the groove or can be glued into the remaining volume of the groove by means of suitable adhesives.

Alternatively to the above methods, the cross-section of the at least one pipe, which is introduced into the at least one groove, possibly together with a cladding substantially corresponds to the cross-section of the at least one groove. In this case, the groove is completely filled by the at least one pipe to be introduced. In this case, the pipe and the filler material is formed in one piece. An elongate material is therefore produced, which has a cross-section substantially corresponding to the cross-section of the groove, and is laid in the groove. The pipe can have one or a plurality of channels for receiving the optical cables and for example, also contain a cover strip or protective material. Assuming corresponding elasticity, a pipe introduced in this way can be pressed into the groove and held therein of its own accord.

Alternatively to this or additionally, such a pipe, possibly with the cladding, can be glued into the groove. In this case, the possible adhesive can be introduced onto the pipe configured in such a manner before laying in the groove or introduced into the groove alternatively to this or additionally to this. A double-sided adhesive tape can also be provided at the factory on the underside and possibly on the side walls or possibly also on the upper side of the pipe in order to secure the pipe in the groove or outside the groove, possibly on a house wall or a bridge pillar or the like.

Preferably the at least one groove together with the at least one supporting step is milled or cut with at least one circular saw blade having a diameter of preferably 400 mm to 500 mm, preferably in a wet method. If the depth of the groove is, for example, 150 mm, therefore only a part of the circular saw blade is in the bed during the cutting process, with the result that a curved profile of the groove having narrower radii can be produced. For example, radii in the range of 2 m are possible. By this means, obstacles along the laying path such as, for example, manhole covers or the like, can easily be circulated and the at least one groove can be disposed in corresponding arcuate courses around these obstacles. Depending on whether a groove having a lateral supporting step or supporting steps arranged on both sides is to be produced, two or three saw blades with different diameters can be disposed adjacent to one another. Alternatively to this, a correspondingly configured milling tool with which a correspondingly configured groove can be produced can be provided.

In order to enable the laying of the at least one pipe in the at least one groove directly after producing the groove, the material removed during the milling or cutting of the at least one groove is preferably sucked off. As a result, a clean saw kerf is achieved after the milling or cutting process.

In particular when milling or cutting the at least one groove in a wet process, it is advantageous if before laying the at least one pipe, the groove is dried preferably with warm pressurised air. A correspondingly dry groove also ensures a good hold of any adhesive. The exhaust gases of the motor-driven milling or cutting device can efficiently be used for drying the groove. The drying with a corresponding air jet and the extraction can also be combined by disposing the line for delivering the air opposite the extraction line.

Pipes with so-called cutting protection fibres can be laid in the groove or in grooves additionally provided parallel thereto so that in the event of any cutting through the groove, it is indicated that cables are located in the bed. The cutting protection fibres wind around the milling or cutting tool and block this or at least indicate that a cable to be protected is located in the bed.

The object according to the invention is also solved by an aforesaid apparatus wherein the milling or cutting device is configured for milling or cutting at least one groove having a step for supporting a filler material or a pipe formed according to the groove in at least one side wall of the groove, and possibly comprising a device for introducing a filler material into the possibly remaining volume of each groove. Such an apparatus can be produced relatively easily and cost-effectively. For the advantages which can be achieved thereby, reference is made to the above description of the process features of the invention.

The milling or cutting device can be configured for milling or cutting at least one groove having respectively one supporting step in each side wall of the groove for forming a groove having a substantially T-shaped cross-section. Such a milling or cutting device can be achieved by a circular cutting blade having cutting or saw blades of smaller diameter arranged on both sides. A corresponding milling tool is also possible.

According to a further feature of the invention, the milling or cutting device is configured for milling or cutting an additional groove in the supporting step in at least one side wall of the groove. Such a milling or cutting device can be achieved by five circular cutting or saw blades, wherein the middle saw blade has the largest diameter, the saw blades arranged on both sides thereof have the smallest diameter and the outermost saw blades have a diameter lying between the diameter of the largest and the smallest saw blades.

Advantageously the milling or cutting device is configured for milling or cutting at least one groove having a width 60 mm in the bed. The depth of the groove is adapted accordingly to the respective circumstances. As already mentioned above, a relatively fast and simple manufacture can be achieved with such a groove having relatively small dimensions.

Advantageously, a device for increasing the friction between the at least one pipe and the side walls of the at least one groove is provided, so that emergence of the at least one pipe of its own accord from the at least one groove can be prevented.

The device for increasing the friction between the at least one pipe and the side walls of the at least one groove can be formed by a metering device connected to a container for a granular material or the like, so that after laying the at least one pipe, a granular material or the like, having a grain size of 0.4 to 1.5 mm, preferably rubber granules, but for example, also sand, can be introduced into the at least one groove. A corresponding container and a relevant metering device can be formed relatively simply using gravity. Naturally, devices for actively conveying the granular material such as, for example, corresponding compressed air devices can also be provided.

The device for increasing the friction between the at least one pipe and the side walls of the at least one groove can be formed by a device for providing the outer side of the at least one pipe at least in parts with a friction-enhancing coating or friction-enhancing elements or for roughening the outer side.

Likewise, the device for increasing the friction between the at least one pipe and the side walls of the at least one groove can be formed by a device for providing the at least one pipe with a cladding, which has a friction-enhancing coating or friction-enhancing elements on the outer side or is roughened.

According to a further feature of the invention, an apparatus for winding at least one cover strip is provided, which at least one cover strip is laid in the at least one groove after or at the same time as the laying of the at least one pipe. As already mentioned above, such a cover strip can be used for protecting the at least one pipe. It is also possible that the pipe together with the cover strip is wound jointly on a drum or the like and is at the same time laid in the groove or even the pipe with integrated cover strip is present.

The possible device for introducing a filler material into the possible remaining volume of each groove can be formed by a container for a hardenable filler material, preferably a biologically degradable or water-soluble two-component adhesive, and a metering device connected to the container. Such a dispensing device for a hardenable filler material can be produced relatively simply and cost-effectively, with the result that the overall costs of the laying apparatus are not substantially increased.

Alternatively to this, the possible device for introducing a filler material into the possible remaining volume of each groove can be formed by a device for storing an elastic and/or solid filler material and a device for introducing said filler material into the at least one groove. Depending on the design and condition of the elastic and/or solid filler material, the storage device and introduction device can be formed in various ways, for example, by a drum and a roller for pressing the filler material into the groove.

As already mentioned above, the milling or cutting device is formed by at least one saw blade having a diameter of preferably 400 mm to 500 mm. In the case of producing a plurality of grooves simultaneously, preferably a plurality of saw blades are disposed parallel to one another. An arrangement of two saw blades disposed at an angle to one another for fabricating a groove having a substantially triangular cross-section or the use of a special milling head which produces a corresponding groove shape is also possible.

Advantageously, a suction device is provided for sucking the material removed during the milling or cutting of the at least one groove.

Furthermore, an apparatus can be provided for drying the at least one groove before laying the at least one pipe which, for example, can be formed by supplying the exhaust gases of a motor-driven milling or cutting device.

In addition, a device for winding at least one pipe can be provided with so-called cutting protection fibres, which at least one pipe is laid in the groove or in additionally disposed grooves parallel thereto. The cutting protection fibres wrap around the milling or cutting tool and block this or at least indicate that a cable to be protected is located in the bed.

Advantageously, all the components of the laying apparatus are disposed on a preferably self-propelled carriage. Such a laying apparatus makes it possible to lay corresponding pipes for receiving optical cables at relatively high speed. For example, speeds in the range of a few meters per minute can be achieved in practice. The optical cables can be introduced subsequently into the at least one pipe, preferably blown in, or they can theoretically be already disposed in the at least one pipe before laying.

BRIEF DESCRIPTION OF THE DRAWINGS

The present invention is explained in detail with reference to the accompanying drawings. In the figures:

FIG. 1 to FIG. 6 show various examples of pipes for optical cables introduced into a solid bed using the present method;

FIGS. 1 to 6 show in cross-section grooves produced by various process variants according to the present application for receiving at least one pipe for at least one optical cable in a solid bed.

DETAILED DESCRIPTION OF CERTAIN EMBODIMENTS

Figure 7:
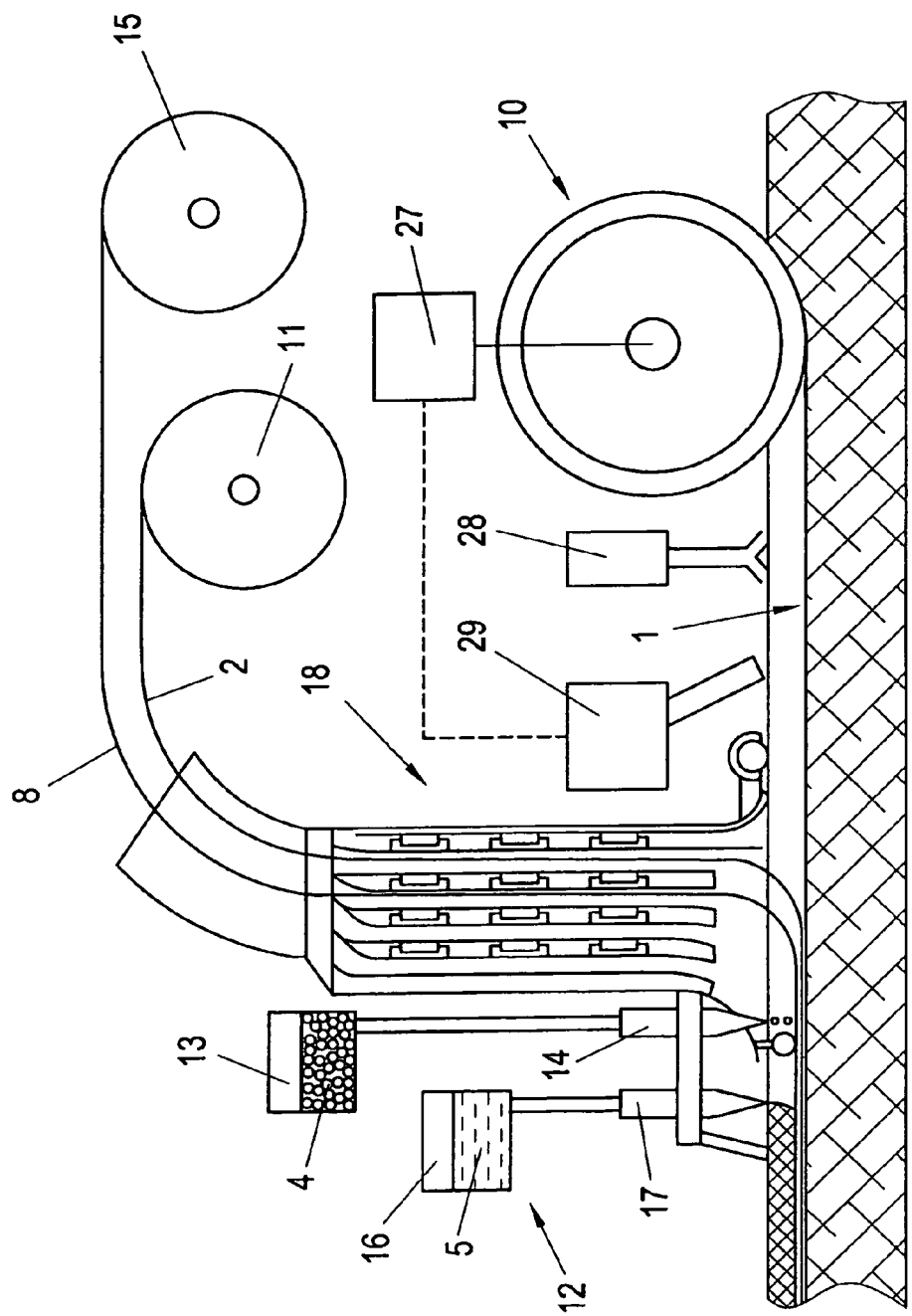
FIG. 7 shows a schematic diagram of an embodiment of a laying apparatus.

FIG. 1 shows a groove 1 having two supporting steps 1" in each side wall 1', resulting in a substantially T-shaped cross-section of the groove 1. Such a groove 1 can be produced by milling or cutting with a corresponding tool, in particular at least one rotating saw blade or a milling tool. Preferably, the entire groove 1, but in any case the at least one supporting step 1" is disposed within the solid bed. Since the groove 1 is used preferably but not exclusively for the temporary introduction of a cable, the depth T of the groove 1 can be selected to be, for example, 150 mm and the width B of the groove 1.ltoreq.60 mm can be selected to be intentionally low in order to also keep the laying expenditure low and achieve a relatively high laying speed. The groove 1 is used for receiving at least one pipe 2, in which at least one optical cable 3 can be introduced. After laying the at least one pipe 2 in the groove 1, the friction between the pipe 2 and the side walls 1' of the groove 1 can be increased by introducing granular material 4 or the like into the groove 1. The granular material 4 or the like has a grain size which enables the granular material 4 or the like to intrude at least in part into the gap formed between the outer side of the pipe 2 and the side walls 1' of the groove 1, which leads to a fixing of the pipe 2 inside the groove 1. In this way, emergence of the pipe 2 of its own accord from the groove 1 is prevented before any fixing with a corresponding filler material 5 is made. The example shown comprises a hardenable filler material 5, for example, a two-component adhesive which is introduced in liquid or viscous form into the remaining volume of the groove 1 after laying the at least one pipe 2 and is then hardened possibly with the assistance of warm air to accelerate the drying process. As a result of the at least one supporting step 1" according to the invention in the groove, forces, exerted on the filler material 5 for example by a vehicle driving over the bed, can be led off into the bed and the pipe 2 and consequently, the optical cable 3 laid therein can be protected from inadmissibly high forces. Naturally, one supporting step 1" can also be provided only in one side in a side wall 1' of the groove 1 so that the groove 1 has a cross-section in the form of an inverted "L" (not shown). The surfaces defining the supporting step 1" need not necessarily enclose a right angle.

In the variant according to FIG. 2, the pipe 2 introduced into the groove 1 is also fixed with a granular material 4 in the groove 1 and then however, a prefabricated filler material 6 comprising elastic or solid material is inserted in the remaining volume of the groove 1. The filler material 6 can be pressed or rolled into the groove 1 and rests on the supporting steps 1" of the groove 1. The filler material 6 can be configured so that the friction at the side walls 1' of the groove 1 is increased and consequently emergence of the filler material 6 of its own accord from the groove 1 is prevented or rendered difficult. In the example shown, this is indicated by the rough surfaces of the side walls of the filler material 6. In addition, the filler material 6 can also be glued into the groove 1.

In the variant according to FIG. 3, the outer side of the pipe 2 is provided with a friction-enhancing coating 7 or corresponding friction-enhancing elements or is configured to be suitably roughened so that emergence of the pipe 2 of its own accord from the groove 1 is prevented or rendered difficult. The remaining volume of the groove 1 can then be filled again with a hardenable filler material 5. Furthermore, an additional groove 9 is disposed in each supporting step 1" of the groove 1, thus forming a type of thrust bearing. The hardenable filler material 5 therefore holds together the groove 1 by means of the webs formed between the groove 1 and the additional grooves 9 in the horizontal direction transverse to the course of the groove 1 and prevents tearing of the bed, if, for example, the bed, e.g. the asphalt surface is cut through by the groove 1. The groove 1, the supporting steps 1" and the possible additional grooves 9 need not necessarily have a substantially rectangular cross-section but can have various shapes. In any case, in the embodiment according to FIG. 3 or a similar variant, the groove 1 is held together or intermeshed by a hardenable filler material 5, a prefabricated filler material 6 or a suitably shaped pipe 2 or cladding of the pipe 2 transverse to the course of the groove 1.

In the variant according to FIG. 4, a pipe 2 with a friction-enhancing coating 7, friction-enhancing elements or a corresponding roughened outer side is also introduced into the groove 1 and then a cover strip 8 is laid over the pipe 2 in the groove 1. The cover strip 8 is used to protect the pipe 2 or the optical cable 3 running therein and can consist of plastic or metal. In addition to a mechanical protection of the pipe 2, this also prevents direct contact of the pipe 2 with the hardenable filler material 5 which is then poured into the groove 1 including the lateral supporting steps 1" following the cover strip 8.

In the variant according to FIG. 5, after introducing the cover strip 8, an elastic or solid filler material 6 has been inserted into the remaining volume of the groove 1.

The variant according to FIG. 6 shows a pipe 2 whose cross-section substantially corresponds to the cross-section of the groove 1, that is in the example shown, a T-shaped pipe 2 in which a cover strip 8 is additionally integrated. The side surfaces of the pipe 2 are provided with a friction-enhancing coating 7, friction-enhancing elements or a corresponding roughened surface, so that emergence of the pipe 2 of its own accord from the groove 1 can be prevented or rendered difficult. The cover strips 8 can be configured in different ways, for example, they can have X-shaped, zigzag-shaped or the like cross-section. If the pipe 2 is formed by a cover strip 8 having a cross-section in the manner of an inverted "V", destruction of the pipe 2 or the optical cable 3 running therein, in particular by pointed objects such as, for example, nails, can be effectively prevented since these pointed objects are deflected by the cover strip 8 having a roof-shaped cross-section (see FIG. 9).

FIG. 7 shows a schematic diagram of an apparatus according to the invention for introducing at least one pipe 2 for at least one optical cable 3 into a solid bed. The at least one groove 1 is introduced into the bed by means of a milling or cutting device 10, in particular one or a plurality of cutting blades. Then the at least one pipe 2 preferably wound on a drum 11 is introduced into the groove 1 and possibly a cover strip 8 wound on a corresponding apparatus 15 is introduced over the pipe 2 into the groove 1. A granular material 4 located in a container 13 can be scattered onto the pipe 2 by means of a corresponding metering device 14, thereby preventing any emergence of the at least one pipe 2 of its own accord from the at least one groove 1. The possibly remaining volume of the groove 1 above the pipe 2 and possibly cover strip 8 is filled with the aid of a device 12 for introducing a filler material. In the example shown according to FIG. 7, a hardenable filler material 5 is provided in a container 16 and is metered into the groove 1 by means of a corresponding metering device 17. After the hardening of the hardenable filler material 5, the laying of the pipe 2 is completed and the bed can be returned to its original use, for example as a roadway or footpath. The optical cables are preferably blown into the channels thereof after the pipe 2 has been laid. The milling or cutting device 10 is connected to a corresponding drive 27, for example, an internal combustion engine or an electric motor. In addition, a suction device 28 can be provided for sucking the material removed during the milling or cutting of the at least one groove 1. Furthermore, an apparatus 29 can be provided for drying the at least one groove 1 before laying the at least one pipe 2, which for example can be formed by supplying the exhaust gas of the drive 27 of the milling and cutting device 10 configured as an internal combustion engine, as indicated by the dashed line between the drive 27 and the drying device 29. All of the above components of the apparatus for introducing the pipe 2 into the solid can be disposed on a preferably self-propelled carriage 18.

Figure 8:
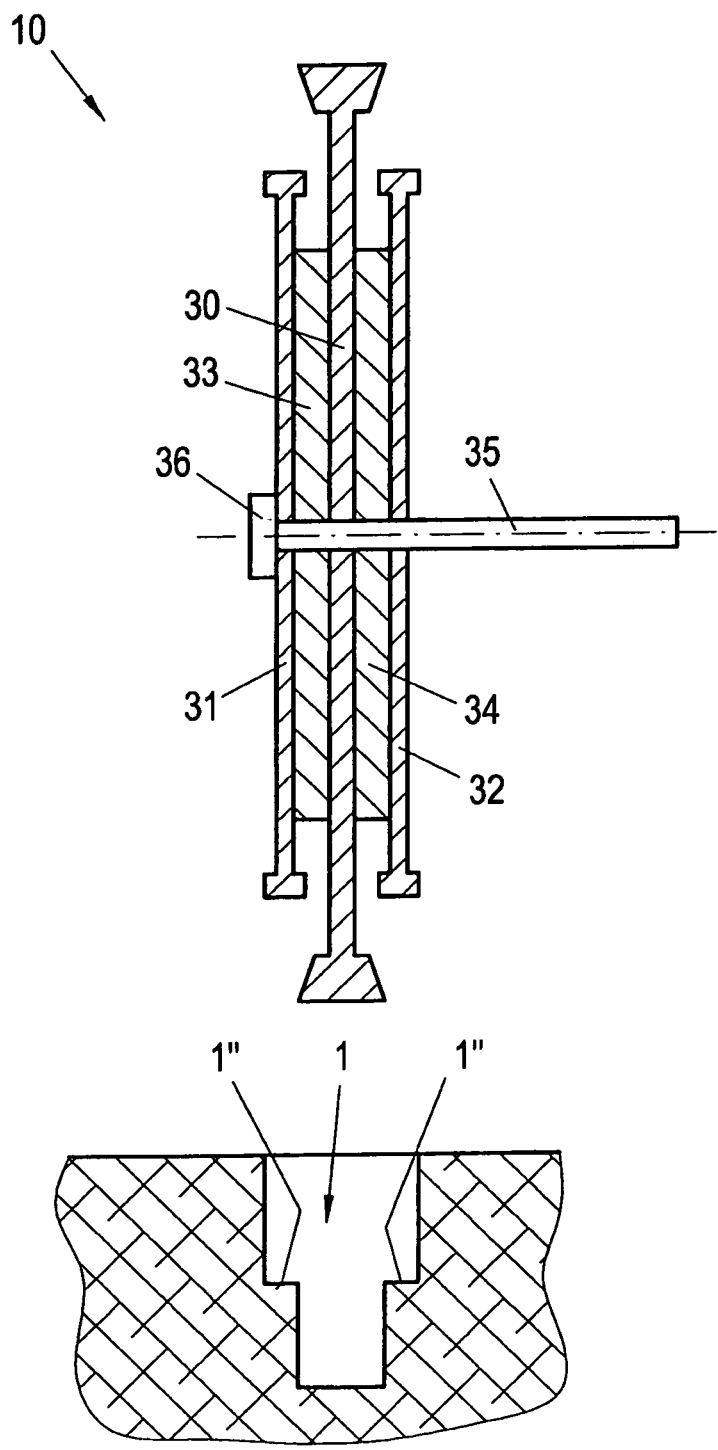
FIG. 8 shows an embodiment of a milling or cutting device of an apparatus according to the invention for introducing at least one pipe for at least one optical cable into a solid bed.

FIG. 8 shows an embodiment of a milling or cutting device 10 for producing a groove 1 having two lateral supporting steps 1'', as indicated in the lower part of the diagram. The cutting or milling device 10 consists of three saw blades 30, 31, 32 which are spaced apart from one another by corresponding disks 33, 34. The middle saw blade 30 has the largest diameter and is used to form that groove 1 in which the at least one pipe 2 is to be laid. For example, the saw blade 30 can have a diameter of 400 mm and a cutting width of 15-20 mm. The lateral saw blades 31, 32 are used to produce the supporting steps 1'' in the side walls 1' of the groove 1 and have accordingly reduced diameters compared with the saw blade 30. For example, the saw blades 31, 32 can have a diameter of 240 mm and a cutting thickness or an overhang over the cutting width of the saw blade 30 of a few millimeters. The saw blades 30, 31, 32 and disks 33, 34 are connected via a shaft 35 to the drive 27 (not shown), wherein a corresponding locknut 36 is disposed at the end of the shaft 35. The milling or cutting device 10 can also be formed by a correspondingly configured milling tool which is adapted to the desired shape of the groove 1.

Figure 9:
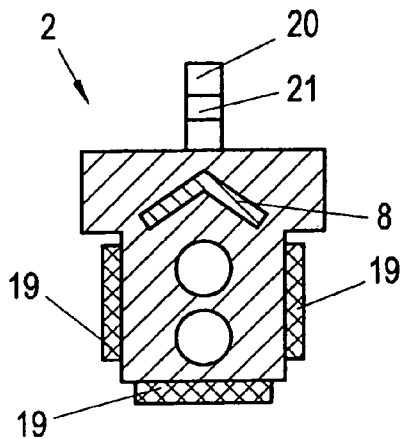
FIGS. 9 and 10 show two examples of preferred embodiments of a pipe which is introduced into the groove.

FIG. 9 shows an embodiment of a pipe 2, whose cross-section substantially corresponds to the cross-section of the groove 1. In the exemplary embodiment shown the pipe 2 has a substantially T-shaped cross-section with two channels for receiving the optical cables (not shown). Whereas one channel, preferably the lower one for receiving optical cables 3, is provided for data transmission, the other channel can also be used for other purposes, for example, the installation of corresponding lines for a traffic control system. The lines for forming a traffic control system can also be integrated in the upper region of a pipe 2 configured in this manner. Such a system can be used for the orientation of motor vehicles and for combination with a navigation system. Naturally, in addition to the pipe 2 for receiving optical cables 3, other lines (such as lines 41 and 42 shown in FIGS. 14 and 16) can also be laid loosely in the prefabricated groove 1 and then closed with a filler material 5, 6 possibly with interposed cover strips. A cover strip 8 is integrated in the pipe 2 and configured in a roof shape or in the form of an inverted "V". In addition, double-sided adhesive tapes 19 or adhesive layers can be disposed on the underside, the side surfaces and also the upper side of the pipe 2, by which means the pipe 2 can be secured in the groove 1 but also on other objects if the pipe 2 is laid outside the groove 1. Prefabricated lugs 20 or the like, in each of which a hole 21 is provided, can be arranged on the upper side of the pipe 2, preferably at regular intervals. Such lugs 20 can be used to fasten the pipe 2 for receiving the optical cables to specific objects. For this purpose, for example, wires, cords, or the like can be passed through the hole 21 and the pipe 2 can thereby be fastened to specific objects. Should the lugs 20 not be required or interfere in a pipe 2 disposed in a groove in the bed, these can also be removed subsequently, which can be facilitated by corresponding predetermined breaking points.

Figure 10:
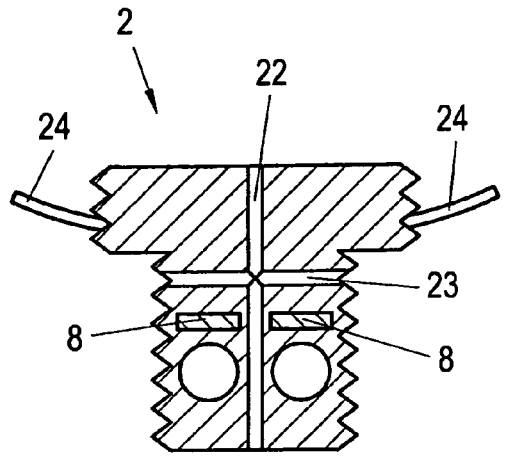

FIG. 10 shows an alternative embodiment of a pipe 2 in cross-section, wherein passages 22, 23 are preferably provided at regular intervals, which can be used for fixing the pipe 2 in the groove 1 or outside the groove 1. Both vertical passages 22 and also horizontal passages 23 can be provided. Corresponding nails, screws, cables or wires can be introduced through the passages 22, 23, with the aid of which the pipe 2 can be fixed in the groove 1 or outside the groove 1. For the same purpose, fastening cables 24 or the like can preferably also be integrated at regular intervals in the pipe 2. Such a fastening of the pipe 2 is necessary in particular when the pipe 2 is guided out from the groove 1 in the bed and must be guided to a house of a household to be provided with optical cables or over a bridge or another obstacle. A simple and rapid fastening to corresponding buildings or the like can be accomplished by means of the said fastening aids.

Figure 11:
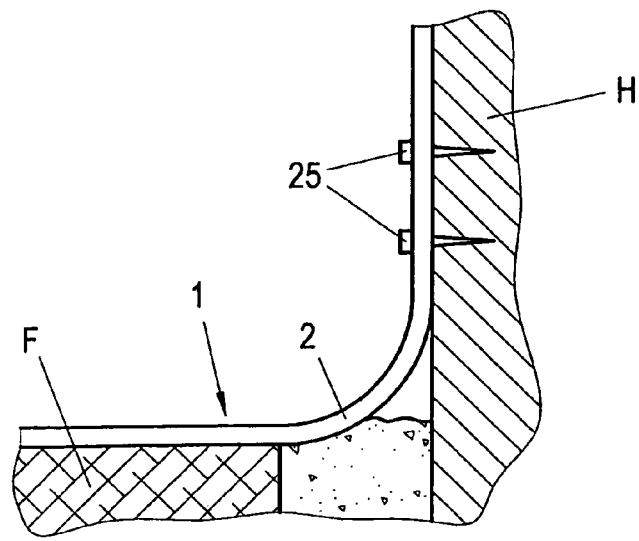
FIG. 11 shows a schematic view of a case of application in which the optical cables are guided in a corresponding pipe to a house.

FIG. 11 shows an application of the method described with the aid of a corresponding pipe 2 when providing a household with a connection via optical cable. The pipe 2 runs in a roadway F in a correspondingly fabricated groove 1 as far as in front of the house of the household to be supplied. In the example, shown the pipe 2 is guided from the end of the groove 1 in the roadway F along the wall of the house H and is fixed therefore, for example, by means of a double-sided adhesive tape 19 (see FIG. 9) or by means of fastening elements 25 (see FIG. 10) such as nails or screws arranged through corresponding passages 22, 23 (see FIG. 10) in the pipe 2. In this way, a corresponding supply of the household with the corresponding data lines can be made rapidly.

Figure 12:
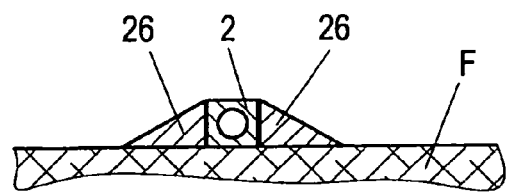
FIG. 12 shows a cross-section through a pipe laid on a road for receiving optical cable.

Finally FIG. 12 shows a cross-section in the area of the road way F on which a pipe 2 is laid on the surface of the roadway F without fabricating a groove 1. Such a bridging may be necessary, for example, if a groove cannot or must not be introduced into the roadway F (for example, for reasons of monument protection). In the case of a pipe 2 laid on the roadway F or the like, it is expedient to provide corresponding wedge-shaped elements 26 laterally adjacent to the pipe 2 to suitably protect the optical cable running therein and for example, enable a vehicle to drive over. Depending on the application, the elements 26 can be fabricated from different materials such as, for example, plastic but also metal and for safety connected to the roadway F and/or the pipe 2.

Figure 13:
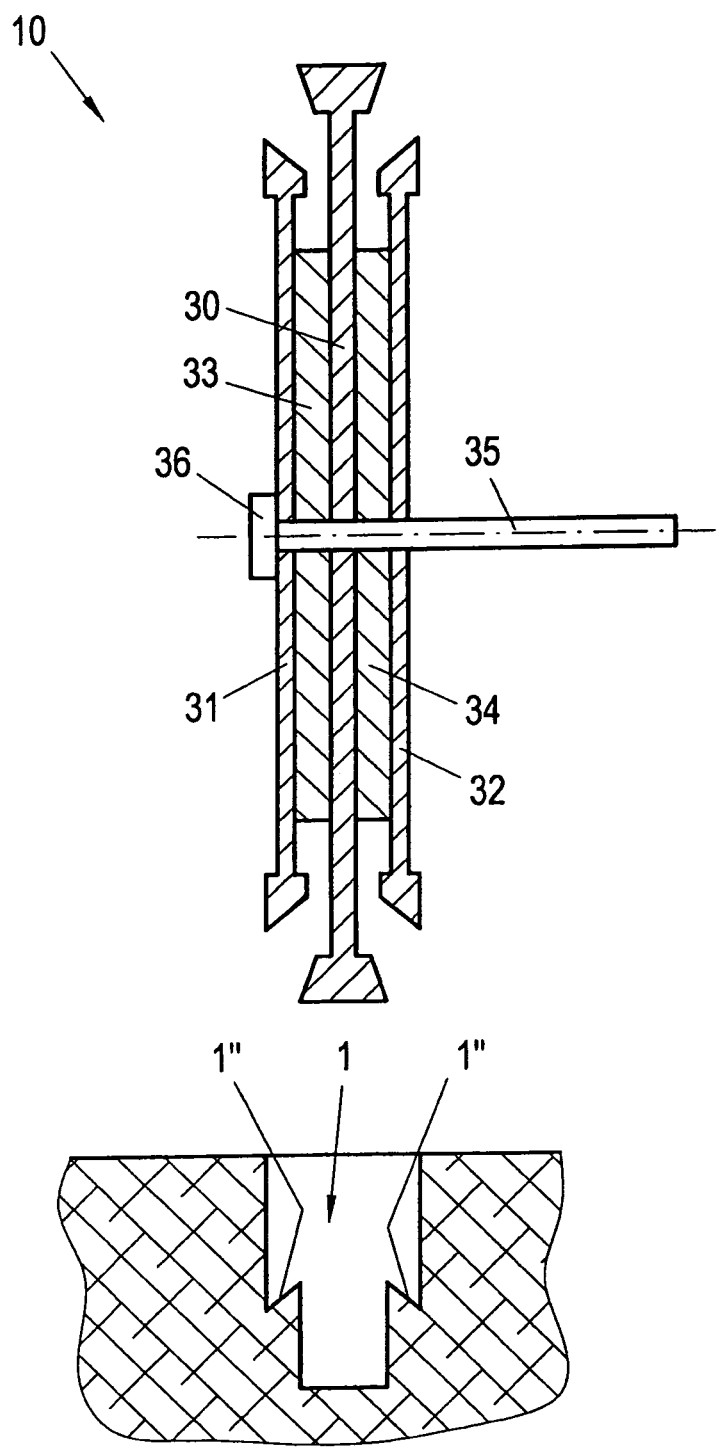
FIG. 13 shows a further embodiment of a milling or cutting device of an apparatus according to the invention for introducing at least one pipe for at least one optical cable into a solid bed.

FIG. 13 shows a modified embodiment of a milling or cutting device 10 compared with FIG. 8 for producing a groove 1, wherein the two lateral supporting steps 1'' are configured to slope downwards towards the outside. This is achieved by corresponding outer saw blades 31, 32 of the milling or cutting device 10. As a result of the outwardly sloping supporting steps 1'', after filling with a filler material 6 (not shown) the groove 1 is held together by this and breaking up, for example, by frost or in the case of cutting through the solid bed, is prevented. The angle of the slope of the supporting steps 1'' can be selected in various ways. In addition, the supporting step 1'' need not necessarily be flat but can have a curved or different profile in cross-section.

Figure 14:
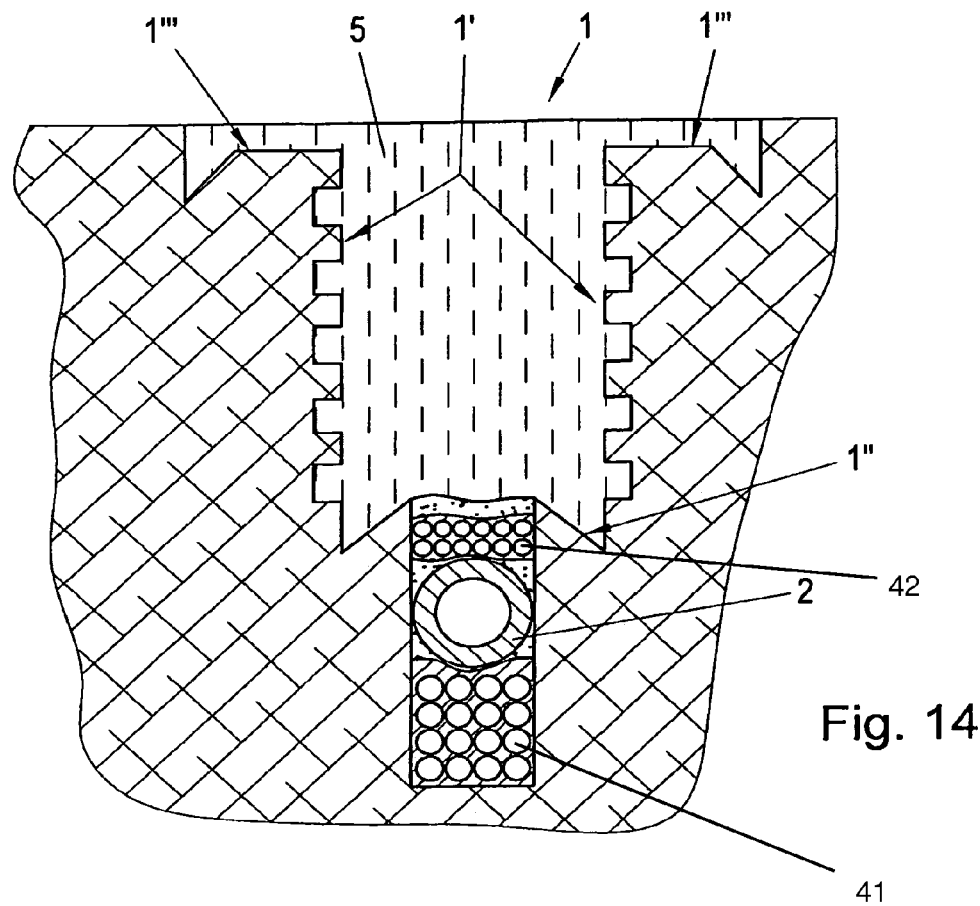
FIG. 14 shows a variant of a groove for laying at least one pipe for optical cable in a solid bed.

FIG. 14 shows another variant of a groove 1 in a solid bed, wherein the lateral supporting steps 1'', as in the embodiment according to FIG. 13, slope outwardly downwards. In addition, two further steps 1''' are also again provided with an outwardly downwardly sloping profile. This shape of the groove 1 can be produced relatively easily, preferably in one operation using a suitably shaped milling or cutting device 10 (not shown). After laying at least one pipe 2 for optical cable or the like, the part of the groove 1 located above the supporting step 1'' is filled with a filler material 5, for example, a two component adhesive or bitumen. As a result of the sloping sections in the supporting steps 1'' and the additional steps 1''', the filler material 5 accordingly holds the groove 1 together and prevents any breaking of said groove. In addition, structures can be provided on the side walls 1' of the groove 1, by which means a better connection of the filler material 5 to the solid bed can be achieved. In the exemplary embodiment shown, these structures are formed by correspondingly shaped gradations running in the longitudinal direction of the groove 1.

Figure 15:
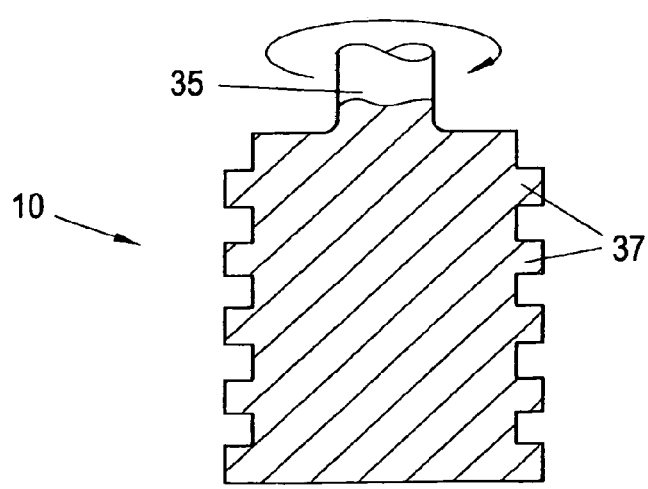
FIG. 15 shows a suitable milling or cutting tool for producing the groove according to FIG. 14.

FIG. 15 shows an exemplary embodiment of a milling or cutting tool 10 for producing such structures in the side walls 1' of the groove 1. Cutting edges 37 are provided on the milling or cutting tool 10 according to the structures. The milling or cutting tool 10 is rotated about a shaft 35 and is guided substantially horizontally through the previously fabricated groove 1. Naturally, other structures can also be produced in the side walls 1' of the groove 1 using different milling or cutting tools, which bring about an improvement of the connection between filler material 6 and solid bed.

Figure 16:
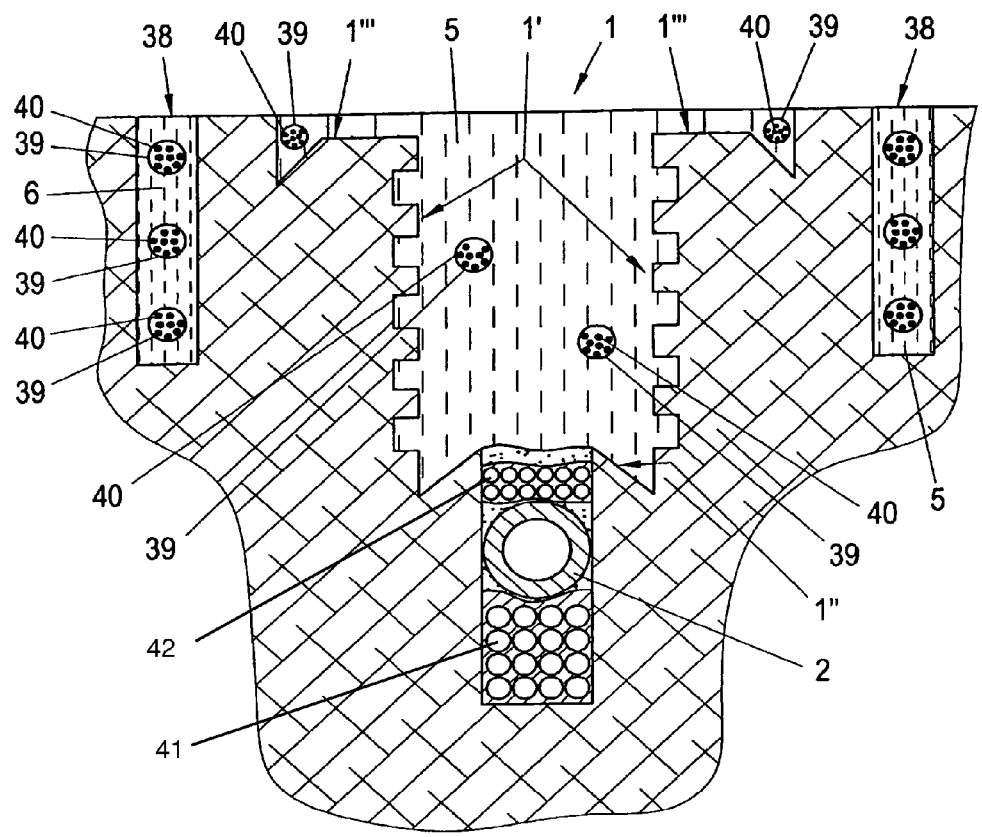
FIG. 16 shows another variant of a groove for laying at least one pipe for optical cable in a solid bed, wherein cutting protection fibres are additionally provided.

FIG. 16 shows a similar embodiment of a groove 1, as FIG. 14, wherein pipes 39 in which so-called cutting protection fibres 40 run, are provided inside the filler material 5 in the groove 1 or inside the filler material 5 of additionally provided grooves 38. These cutting protection fibres 40 wrap around the milling or cutting tools when attempting to cut through the groove 1 together with components disposed therein and block this or at least signal that a cable is located in the solid bed. The pipes 39 with the cutting protection fibres 40 can be arranged at a plurality of suitable locations inside the filler material 5. Additionally or alternatively to this, the filler material 5 or prefabricated filler material 6 can also be suitably coloured and the route thereby suitably marked. When working on the solid bed, attention is thereby drawn to the optical cable 3 running in the groove 1 and any damage to the optical cable 3 can be prevented. The afore-mentioned cover strip 8 can also contain such cutting protection fibres 40 or consist of such fibres.

The groove 1 produced in the bed is used mainly but not exclusively to receive at least one pipe 2 for optical cable 3. Naturally, the groove 1 produced can also be used for receiving various other lines (such as lines 41 and 52 shown in FIGS. 14 and 16) or the like for various purposes, for example, the afore-mentioned traffic control system.

The invention claimed is:

1. A method for introducing at least one pipe into a solid bed comprising a concrete or asphalt surface, the method comprising:
   forming, by milling or cutting, a groove in a solid bed comprising a concrete or asphalt surface, the groove including a bottom, at least one side wall extending up from the bottom, the at least one side wall having a supporting step having a top side at an upper end of the at least one side wall, the step constructed and adapted such that forces pressing down on the top side of the step are transmitted down into the at least one side wall;
   laying at least one pipe into the groove at a height above the bottom, but below the top side of the step; and
   disposing a load bearing material over the at least one pipe with at least a portion of the load bearing material over at least a portion of the step, the load bearing material having a unitary structure or being hardenable to form a unitary structure, the load bearing material constructed of materials and configured and positioned with respect to the step, such that when a force is applied onto the load bearing material, the force is transmitted through the load bearing material, onto the step and down into the at least one side wall, thereby protecting the at least one pipe from damage resulting from said force.

2. The method according to claim 1, wherein groove is formed to include two side walls each having a supporting step, resulting in a substantially T-shaped cross-section of the groove.

3. The method according to claim 1, wherein the top surface of the step is formed to include an additional sub-groove.

4. The method according to claim 1, wherein the groove is formed to be a width less than or equal to 60 mm.

5. The method according to claim 1, further comprising: adding material between the at least one pipe and the groove to increase the friction between the at least one pipe and the at least one side wall of the groove.

6. The method according to claim 5, wherein increasing said friction comprises: after laying the at least one pipe, introducing a granular material having a grain size of 0.4 to 1.5 mm into the groove, in a manner to wedge the at least one pipe inside the groove.

7. The method according to claim 5, further comprising: providing at least a portion of an outer surface of the at least one pipe with a friction-enhancing coating, friction-enhancing elements, or roughening of the outer surface of the at least one pipe.

8. The method according to claim 7, further comprising: before laying the at least one pipe in the groove, providing the at least one pipe with a cladding which has a friction-enhancing coating or adding friction-enhancing elements on at least a portion of an outer surface of the at least one pipe, or roughening at least a portion of the outer surface of the at least one pipe.

9. The method according to claim 1, further comprising: after laying the at least one pipe, laying a unitary cover strip in the groove, over the at least one pipe, but below the load bearing material.

10. The method according to claim 1, wherein the load bearing material is a hardenable material and the method includes hardening the hardenable material.

11. The method according to claim 1, wherein the load bearing material is an elastic or solid prefabricated insert.

12. The method according to claim 1, wherein the at least one pipe has a cross section that is substantially complementary to the cross section of the groove.

13. The method according to claim 12, further comprising: gluing the at least one pipe into the groove.

14. The method according to claim 1, wherein the groove is milled or cut with at least one circular saw blade having a diameter of 400 mm to 500 mm.

15. The method according to claim 1, further comprising suctioning off the material removed during the milling or cutting of the groove.

16. The method according to claim 1, further comprising, before laying the at least one pipe, drying the groove with warm pressurised air.

17. The method according to claim 1, further comprising: laying additional pipes in the groove, the additional pipes each containing cutting protection fibres.

18. The method of claim 1, wherein the at least one pipe includes a channel for receiving at least one transmission cable therein.

19. An apparatus for introducing at least one pipe into a solid bed comprising a concrete or asphalt surface, the apparatus comprising:
   a milling or cutting device suitable for milling or cutting a groove in a solid bed comprising a concrete or asphalt surface;
   at least one drum on which the at least one pipe to be laid is wound; and
   a filling device constructed and adapted to introduce a load bearing material into the groove, over the at least one pipe, after the at least one pipe is laid into the groove,
   wherein the milling or cutting device includes a central saw blade having a diameter and an outer lateral saw blade disposed on one side of the central saw blade, the central saw blade and the outer lateral saw blade both connected to a common shaft for rotating the central saw blade and the lateral saw blade, and wherein the lateral saw blade has a diameter smaller than the diameter of the central saw blade, such that when the milling or cutting device is advanced while the central saw blade and the outer lateral saw blade are rotated, the milling or cutting device produces in the bed a groove including a bottom, a side wall extending up from the bottom, the side wall having a supporting step having a top side at an upper end of the side wall, and wherein the filling device is constructed and adapted to introduce the load bearing material over the supporting step in a position, such that forces pressing down on the load bearing material are transmitted down into the side wall, wherein the filling device is constructed and adapted to introduce the load bearing material over the supporting steps in a position, such that forces pressing down on the load bearing material are transmitted down into the side walls.

20. The apparatus according to claim 19, wherein the milling or cutting device further includes an additional outer lateral saw blade disposed on another side of the central saw blade, the additional outer lateral saw blade having a diameter smaller than the diameter of the central saw blade, such that when the milling or cutting device is advanced while the central saw blade and the lateral saw blades are rotated, the milling or cutting device produces in the bed a groove having a substantially T-shaped cross-section.

21. The apparatus according to claim 19, wherein the milling or cutting device is configured for milling or cutting an additional sub-groove in the supporting step) in the at least one side wall of the groove.

22. The apparatus according to claim 19, wherein the milling or cutting device is configured for milling or cutting a groove having a width less than or equal to 60 mm in the bed.

23. The apparatus according to claim 19, further including a device for increasing friction between the at least one pipe and the side wall of the groove.

24. The apparatus according to claim 23, wherein the device for increasing friction between the at least one pipe and the side wall of the groove includes a metering device connected to a container for a granular material.

25. The apparatus according to claim 23, wherein the device for increasing friction between the at least one pipe and the side wall) of the groove includes a device for providing at least a portion of an outer surface of the at least one pipe with a friction-enhancing coating or a friction-enhancing element, or a device for roughening the outer surface of the at least one pipe.

26. The apparatus according to claim 23, wherein the device for increasing friction between the at least one pipe and the side wall of the groove includes a device for providing the at least one pipe with a cladding, which has a friction-enhancing coating or a friction-enhancing element, or is roughened.

27. The apparatus according to claim 23, further including a device for winding at least one cover strip and for laying the at least one cover strip after or at the same time as the laying of the at least one pipe.

28. The apparatus according to claim 23, wherein the device for introducing the load bearing material into groove includes a container for the load bearing material and a metering device connected to the container.

29. The apparatus according to claim 23, wherein the device for introducing the load bearing material into the groove includes a device for storing the load bearing material and a device for introducing said load bearing material into the groove.

30. The apparatus according to claim 23, wherein the milling or cutting device includes at least one saw blade having a diameter of 400 mm to 500 mm.

31. The apparatus according to claim 23, further including a suction device for suctioning material removed during the milling or cutting of the groove.

32. The apparatus according to claim 23, further comprising a drying device for drying the groove before laying the at least one pipe.

33. The apparatus according to claim 32, wherein the drying device supplies exhaust gases of a motor-drive milling or cutting device.

34. The apparatus according to claim 33, further comprising a device for winding at least one pipe with cutting protection fibres.

35. The apparatus according to claim 34, wherein the apparatus is disposed on a self-propelled carriage.

36. A method for introducing at least one pipe into a solid bed, the at least one pipe including:
    an upper portion, and
    a lower portion including at least one channel configured to receive at least one transmission cable therein,
    wherein the upper portion has a greater width than a width of the lower portion and forms a stepped configuration relative to the lower portion,
the method comprising:
    forming, by milling or cutting, a groove in the bed, the groove including a bottom, at least one side wall extending up from the bottom, the at least one side wall having a supporting step having a top side at its upper end, the step constructed and adapted such that forces pressing down on the top side of the step are transmitted down into the side the groove having a cross section substantially complementary to a cross section of the at least one pipe; and
    laying the at least one pipe into the groove such that at least a shoulder portion of the upper portion of the at least one pipe rests on the supporting step of the groove, wherein when a force is applied onto a top surface of the at least one pipe laid in the groove, the force is transmitted through the shoulder portion of the at least one pipe, onto the step and down into the at least one side wall, thereby protecting the at least one channel of the at least one pipe from damage resulting from said force.

37. The method of claim 36, wherein the at least one pipe is laid into the groove such that a surface of the at least one pipe is substantially flush with the surface of the solid bed.

38. The method of claim 36, wherein the at least one pipe further includes one or more cover strips for protecting the at least one channel located thereunder.

39. The method of claim 36, wherein the at least one pipe includes an outer surface, at least a portion thereof being roughened or coated with an adhesive tape or layer for increasing the friction between the at least one pipe and the groove.

40. The method of claim 36, wherein the solid bed comprises an asphalt or concrete surface.

* * * * *